Dec. 18, 1945.  W. H. BARLOW  2,391,288
STUD MEMBER FOR QUICK DETACHABLE FASTENING DEVICES
Filed May 20, 1943

INVENTOR.
William H. Barlow
BY Fraser, Myers & Manley.
ATTORNEYS

Patented Dec. 18, 1945

2,391,288

UNITED STATES PATENT OFFICE 2,391,288

STUD MEMBER FOR QUICK DETACHABLE FASTENING DEVICES

William H. Barlow, Waterbury, Conn., assignor to Scovill Manufacturing Company, Waterbury, Conn., a corporation of Connecticut Application May 20, 1943, Serial No. 487,680

11 Claims. (Cl. 24—221)

My present invention relates to a stud unit for quick detachable fastening devices of the type adapted for releasably clamping and locking together two or more parts in juxtaposed relation. Such quick detachable fastening devices, although susceptible of general application and use, are primarily intended for detachably securing aircraft cowling and inspection plates or covers in place. More particularly, the stud of my present invention is of the type formed with a cross-pin extending therethrough in axially spaced relation to an enlarged head, said cross-pin being intended for cooperation with a cam surface or surfaces over which the cross-pin is caused to ride when securing the parts in assembled relation. For the purpose of facilitating the securing of the fastening devices together it is desirable to have the stud unit carried by the cover plate, cowling or other part in a manner to normally prevent its accidental removal therefrom while yet permitting of its quick removal, when necessary. In other words, my invention relates to a stud unit which is quickly attachable to and detachable from a supporting or carrying part having an opening therein through which the shank of the stud extends.

Among the objects of my invention are to provide such a stud unit which will be simple in construction, which will be easy to apply and remove, and which will, nevertheless, be securely held on the carrying part against accidental removal therefrom.

The foregoing and other objects not specifically recited, I accomplish by mounting on the shank of the stud between the cross-pin and the enlarged head, a contractile member normally serving to prevent passage of said cross-pin through the opening in the carrying part but adapted, upon contraction, to permit a tilting of the stud to a degree whereby the cross-pin may be passed through the opening in the carrying part.

The invention will be better understood from the detailed description which follows, when considered in connection with the accompanying drawing showing two embodiments, and wherein.

Figure 1:
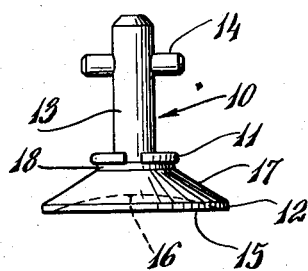
Figure 1 is a front elevation of one embodiment of the stud unit constituting my present invention.
Figure 2:
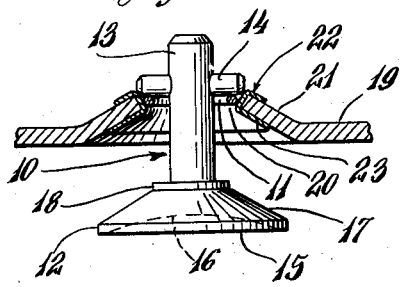
Fig. 2 is a view showing the stud unit mounted on a carrying part, which latter is shown in section.
Figure 3:
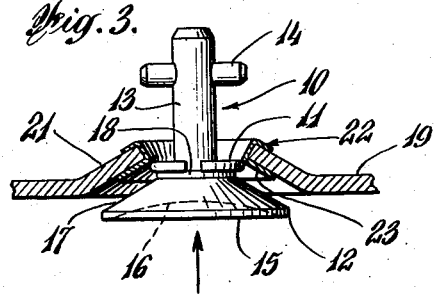
Fig. 3 shows the manner of mounting the stud unit on the carrying part.

Referring first to Figs. 1 to 4 of the drawing, the stud unit consists of a stud 10 and a split spring ring 11 carried by the stud. The stud 10 has an enlarged head 12, a shank 13 extending from said head, and a cross-pin or lateral projection 14 extending perpendicularly transversely through the stud in axial spaced relation from the head 12, the projections from the shank being substantially of equal length. As herein shown, the enlarged head 12 has a flat outer surface 15 formed with a milled kerf or groove 16 for accommodating a manipulating tool such as a screw-driver, and a conically tapered inner face 17 which terminates at its inner end in a short cylindrical portion 18. The split spring ring 11 is mounted on the stud between the head 12 and the cross-pin 14 and has a normal outer diameter which is somewhat shorter than the length of the cross-pin 14. The normal outer diameter of the spring ring 11 is also somewhat larger than the diameter of the cylindrical portion 18 at the inner end of the head.

The stud unit is adapted to be removably mounted and held in a relatively loose manner on a part such as a carrying plate 19 through an opening 20 formed therein, which plate may be an airplane motor cowling, an inspection plate or cover, or the like. Where the part 19 is to be used in airplane construction it is desirable that the outer surface 15 on the head of the stud, when mounted in cooperative relation to the other fastening element of the quick detachable fastening device, shall lie flush with the outer surface of said part 19. Hence, as herein shown, the plate is dished or formed with a tapered conical portion 21 which terminates in the opening 20. Also in airplane construction these parts 19 are usually formed of aluminum or other light weight alloy, and since these metals are relatively soft and will not withstand the wear incident to rubbing contact with the stud head caused by the considerable vibration, it is customary to reinforce the part around the opening 20 with a grommet or the like 22 formed of steel or other wear-resisting material. For the purpose of facilitating the securing of the stud to its complemental fastening element it is desirable to have the stud carried by the plate, cowling or other part in a manner to normally prevent its accidental removal therefrom, while yet permitting of its quick removal, when necessary. To accomplish this the split spring ring 11 is relied upon and said spring is formed with a normal outer diameter which is slightly larger than the diameter of the opening 20 in the plate and said outer diameter of the ring is adapted to be contracted to pass through the opening 20 in the plate.

Figure 4:
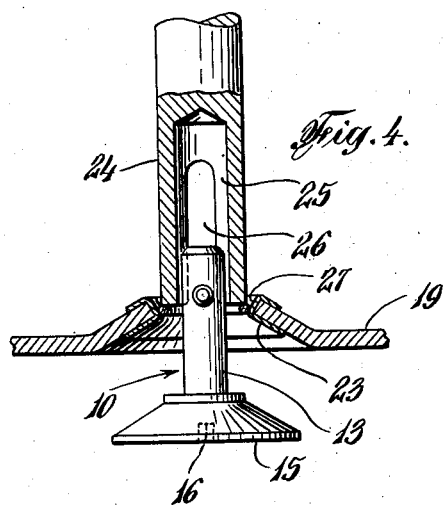
Fig. 4 shows the manner of removing the stud unit from the carrying part.

To mount the stud unit upon the plate 19 it is merely necessary to insert the shank 13 through the opening 20, first tilting the stud somewhat to facilitate the passage of the cross-pin since the length thereof is slightly larger than the diameter of the opening 20. Also to facilitate this action, the diameter of the stud shank is less than the diameter of the opening 20 and the combined diameter of the shank and one of the lateral projections of the pin 14 is less than the diameter of the opening 20. After the shank and cross-pin of the stud has been passed through the opening, the stud is brought into the position shown in Fig. 3 and an axial force is applied in the direction of the arrow to the split spring ring 11 through the head of the stud, i. e., in the direction of the opening 20 which will cause the spring to ride along the tapered face 23 of the grommet 22 and be contracted, thereby reducing its diameter and permitting its passage through the opening 20. The short cylindrical portion 18 at the inner end of the head 12 serves to facilitate the passage of the contracted spring through the opening since the diameter of said cylindrical portion is somewhat less than the diameter of the opening 20 while large enough to support the ring. After the spring has passed through the opening it immediately expands to resume its normal diameter, which, being larger than that of the opening, serves to prevent the accidental withdrawal of the stud from the plate. When it is desired or found necessary to remove the stud unit from the plate, a reverse procedure to that above described is resorted to and is accomplished with the aid of a special tool 24 which, at its operative end, is preferably of cylindrical form and of a diameter slightly less than the normal outer diameter of the spring ring and also less than the diameter of the opening in the plate so that it may pass therethrough. At its operative end the tool 24 is formed with an internal bore 25 of a diameter somewhat larger than that of the stud shank and is bifurcated or slotted, as indicated at 26, to straddle the arms of the cross-pin 14. When this tool is placed over the unheaded end of the stud, as shown in Fig. 4, and axial pressure is applied thereto against the spring ring 11, the latter is caused to ride down along the tapered face 27 of the grommet and is thereby contracted and caused to pass through the opening 20, after which a slight shaking or a tilting of the stud unit will accomplish its removal from the plate.

Figure 5:
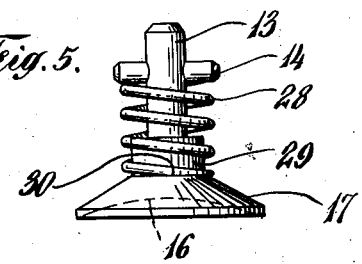
Fig. 5 is a front elevation of a second embodiment of the stud unit of my invention.
Figure 6:
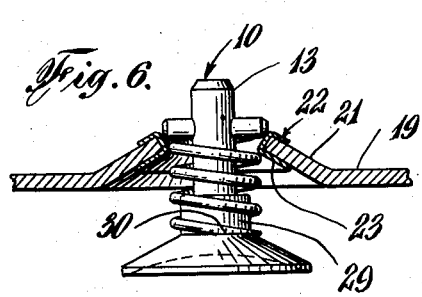
Fig. 6 is a view similar to Fig. 2 showing the stud unit of Fig. 5 mounted on the carrying part.
Figure 7:
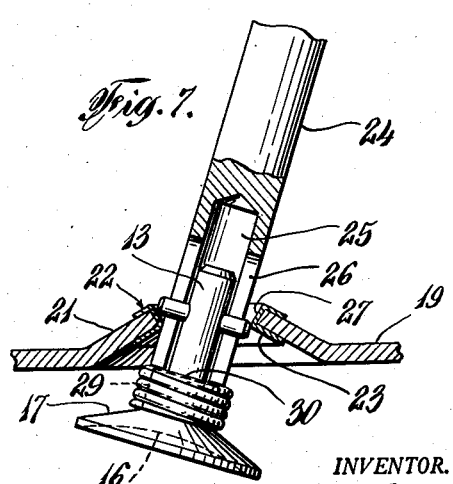
Fig. 7 shows the manner of either mounting or removing the stud unit of Fig. 5 from the carrier plate.

The modification of the stud unit shown in Figs. 5 to 7 differs from that shown in Figs. 1 to 4 in that, instead of a split spring ring, there is a helical coil tension spring 28 mounted on the stud. This spring is of somewhat smaller outer diameter than the opening 20 in the plate and when the stud unit is mounted in said opening the spring provides the stud with what may be termed an artificial enlarged diameter which limits the tilting of the stud unit in the opening to a degree which is insufficient to permit the accidental withdrawal of the spring unit from the plate. Said artificial enlarged diameter also precludes the mounting of the stud unit on the plate without recourse to first restoring, at least in part, the normal diameter of the stud shank so that it may be tilted to such an angle with respect to the axis of the opening that the cross-pin may be passed through said opening. Accordingly, when it is desired to mount the stud unit on the plate the spring 28 must first be contracted against the stud head either by the fingers of the operator or with the aid of a suitable tool, and with the spring in such contracted condition the stud is presented at an angle to the axis in the opening so as to first introduce the cross-pin therethrough, after which, upon releasing the compressive force upon the spring, it will be restored to its normal condition in which it will provide the artificial enlarged diameter for the stud and, in turn, will prevent the accidental removal of the stud from the plate. Likewise, when it is desired to remove the stud unit from the plate, a suitable tool, such as 24, is applied over the unheaded end of the stud to engage the end convolution of the spring, and by holding the stud head and applying pressure with the tool to the spring, it can be compressed to restore the normal diameter to the stud shank below the cross-pin and above the compressed spring, whereupon the stud unit may be tilted so as to permit the withdrawal of the cross-pin through the opening in the plate and the complete withdrawal of the unit from the plate. It will be observed from an inspection of Fig. 7 that the tool 24 may also be used for mounting the stud unit on the plate, in which case one arm of the cross-pin may, by a tilting action, be inserted through the opening, the tool can then be inserted through the opening from the opposite side of the plate over the stud to straddle the cross-pin, and by applying pressure with the tool to the spring, it may be compressed, thus establishing at least in part, the normal diameter for the stud shank which will permit of a greater tilting thereof with respect to the axis in the opening of the plate and allow the second arm of the cross-pin to be passed through the opening. Since the spring 28 is of substantially larger diameter than the stud shank, lateral movement of the spring relatively to the shank may occur, and as this is objectionable, such lateral shifting of the spring is reduced to a minimum by providing the stud shank adjacent the head of the stud with a somewhat enlarged diameter, such as indicated at 29. This enlarged diameter can be provided when making the stud or by the positioning of a sleeve on the stud shank prior to the assembly of the cross-pin on the stud. To provide better engagement contact between the end of the tool 24 and the end convolution of the spring 28 remote from the stud head, the end face 30 of said convolution may be ground flat to lie in a plane perpendicular to the axis of the spring.

From the foregoing description it will be apparent that I have provided exceedingly simple means for assembling and maintaining the stud of a quick detachable fastening device upon a carrying plate or the like, and although I have shown two specific embodiments of my invention it is to be understood that these are shown by way of example and that modification thereof may be resorted to within the range of engineering skill without departing from the spirit of the invention.

What I claim is:

1. A stud unit of a quickly detachable fastening device for releasably locking together a plurality of parts, one of which has a circular opening, in which opening the stud unit can be removably mounted and held against accidental removal while being capable of axial movement within the opening of said part, said stud unit consisting of a stud having an enlarged head incapable of passing through the opening in the part, a shank axially extending from said head and of smaller diameter than the opening in the part, said shank having aligned lateral projections of substantially equal length extending transversely of the shank in axially spaced relation to the head, the combined length of the projections plus the diameter of the shank being slightly greater than the opening diameter in the part and the diameter of the shank plus the axial length of one projection being less than the opening diameter in the part, and a ring-like contractable member somewhat smaller in diameter than the effective end to end length of the projections mounted on the shank and being axially movable between the enlarged head and the lateral projections and adapted to be passed through the opening in the part, and incapable of accidentally passing over either the projections or the enlarged head of the stud.

2. A stud unit of a quickly detachable fastening device for releasably locking together a plurality of parts, one of which has a circular opening in which the stud unit can be removably mounted and held against accidental removal while being capable of axial movement within the opening in said part, said stud unit comprising a stud having an enlarged head incapable of passing through the opening in said part, a shank axially extending from said head and of smaller diameter than the opening in said part, said shank having aligned lateral projections extending transversely of the shank and in axially spaced relation to the head, the combined length of the projections plus the diameter of the shank being somewhat larger than the opening in the part, and the diameter of the shank plus the axial length of one projection being less than the opening diameter in the part, and a split spring ring somewhat smaller in diameter than the effective end to end length of the projections mounted on the shank and being axially movable between the enlarged head and the lateral projections and incapable of accidentally passing over either the projections or the enlarged head of the stud, said spring ring having a normal outer diameter slightly larger than the opening diameter in the part and being adapted to be contracted while on the stud to pass through said opening.

3. A stud unit according to claim 2 wherein the enlarged head on the stud at its inner end is of a diameter less than the opening diameter in the part and of a size to support the spring ring.

4. In combination, a stud unit consisting of a stud and a spring member mounted on the stud and held thereon against accidental removal, and a supporting member having an opening through which said stud unit may be inserted and loosely retained, said stud having an enlarged head of greater diameter than the opening in the supporting member, a shank axially extending from said head and having laterally aligned projections adjacent its opposite end, the combined length of the projections plus the diameter of the shank being greater than the opening diameter and the diameter of said shank and axial length of one projection being less than the opening diameter so as to permit insertion and removal of said stud through said opening by a tilting action, said spring member loosely surrounding the stud shank and being confined between said head and projections against accidental removal, said spring member serving to prevent removal of said stud unit from the supporting member through the opening therein when any portion of the spring member is disposed between said projections and member opening, and said spring member while on the stud being adapted to be contracted and forced to the opposite side of said opening whereby to permit removal of said unit from the supporting member.

5. In combination, a stud unit, and a supporting member having an opening through which said stud unit may be inserted and loosely retained, said stud unit consisting of a stud having an enlarged head of greater diameter than the opening in the supporting member, a shank axially extending from said head and having laterally aligned projections adjacent its opposite end, the combined length of the projections plus the diameter of the shank being greater than the opening diameter and the diameter of said shank and axial length of one projection being less than the opening diameter so as to permit insertion and removal of said stud unit through said opening by a tilting action, and a split spring ring loosely surrounding said shank and confined between said head and projections against accidental removal, said spring ring having a normal diameter larger than the opening diameter in the supporting member and when disposed between the projections and the supporting member serving to prevent removal of said stud unit from said supporting member, and said spring ring being adapted to be contracted and forced through the opening to the opposite side of the supporting member whereby to permit removal of said unit.

6. The combination according to claim 5 wherein the supporting member has means on the side thereof adjacent the head of the stud for contracting the spring ring when axial pressure is applied thereto.

7. The combination according to claim 5 wherein the supporting member has conical surfaces at the opposite faces thereof leading into the opening for contracting the spring ring when axial pressure is applied thereto.

8. A stud unit of a quickly detachable fastening device for releasably locking together a plurality of parts, one of which has a circular opening in which the stud unit can be removably mounted and held against accidental removal while being capable of axial movement within the opening of said part, said stud unit comprising a stud having an enlarged head incapable of passing through the opening in the part, a shank axially extending from said head of smaller diameter than the opening, said shank having aligned lateral projections of substantially equal length extending transversely of the shank in axially spaced relation to the head, the combined length of the projections plus the diameter of the shank being greater than the opening diameter, and the diameter of said shank and axial length of one projection being less than the opening diameter so as to permit insertion and removal of said stud unit through said opening by a tilting action, and a contractable member on said stud normally extending substantially from said head to said projections and providing an artificial enlarged diameter for the stud shank and adapted upon contraction to operatively restore the true diameter to a portion of said shank.

9. A stud unit of a quickly detachable fastening device for releasably locking together a plurality of parts, one of which has a circular opening in which the stud unit can be removably mounted and held against accidental removal while being capable of axial movement within the opening of said part, said stud unit comprising a stud having an enlarged head incapable of passing through the opening in the part, a shank axially extending from said head of smaller diameter than the opening, said shank having aligned lateral projections of substantially equal length extending transversely of the shank in axially spaced relation to the head, the combined length of the projections plus the diameter of the shank being greater than the opening diameter, and the diameter of said shank and axial length of one projection being less than the opening diameter so as to permit insertion and removal of said stud unit through said opening by a tilting action, and a helical coil tension spring on said stud normally extending substantially from said head to said projections and providing an artificial enlarged diameter for the stud shank somewhat smaller than the diameter of the opening in the part and adapted upon contraction to operatively restore the true diameter to a portion of said shank.

10. A stud unit according to claim 9 wherein the shank adjacent the head of the stud is formed to provide a somewhat enlarged diameter to hold the helical spring substantially co-axial with the shank.

11. In combination, a stud unit and a supporting member having an opening through which said stud unit may be inserted and loosely retained, said stud unit consisting of a stud having an enlarged head of greater diameter than the opening in the supporting part, a shank axially extending from said head having laterally aligned projections adjacent the opposite end, the combined length of the projections plus the diameter of the shank being greater than the opening diameter and the diameter of said shank and axial length of one projection being less than the opening diameter so as to permit insertion and removal of said stud unit through said opening by a tilting action, and a helical coiled tension spring on said shank normally extending substantially from said head to said projections and providing an artificial enlarged diameter for the shank somewhat smaller than the opening diameter, said spring serving to prevent removal of said stud unit from said supporting member when any portion of the spring extends into the opening and said spring being adapted to be contracted to operatively restore the true diameter to a portion of the shank extending through the opening whereby to permit a tilting of the stud in the opening and the removal of the unit from the supporting member.

WILLIAM H. BARLOW.